July 8, 1941.  W. C. ROSS ET AL  2,248,898
METHOD OF MAKING RUBBER ARTICLES
Filed Dec. 3, 1938
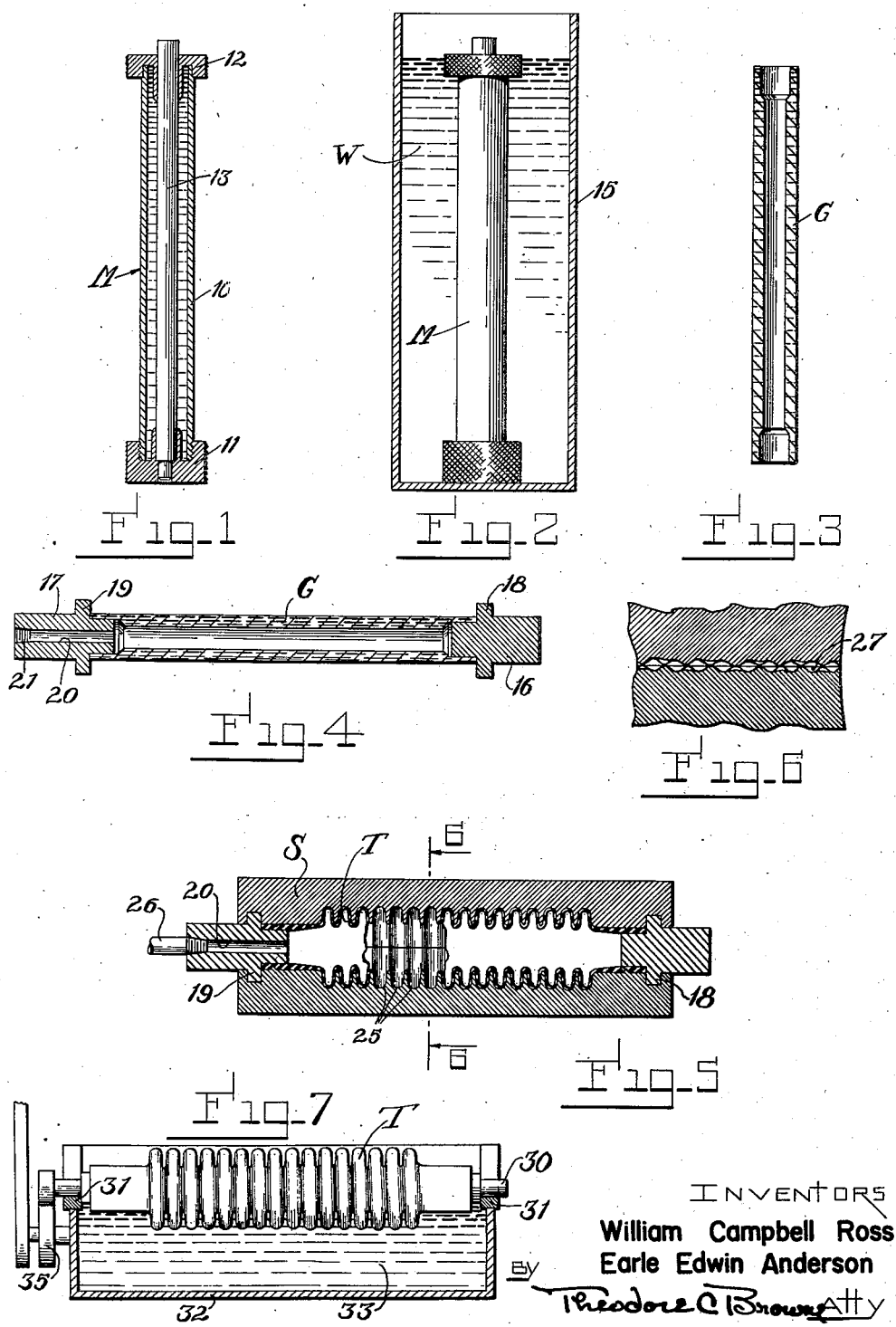
INVENTORS
William Campbell Ross
Earle Edwin Anderson
BY Theodore C. Brown Atty Patented July 8, 1941

2,248,898

UNITED STATES PATENT OFFICE 2,248,898

METHOD OF MAKING RUBBER ARTICLES

William C. Ross, Winchester, and Earle E. Anderson, Auburndale, Mass., assignors to Dewey and Almy Chemical Company, North Cambridge, Mass., a corporation of Massachusetts Application December 3, 1938, Serial No. 243,792

6 Claims. (Cl. 18—56)

The present invention contemplates a method for making rubber articles of irregular shape such as gas mask tubes.

The difficulties which are encountered in the manufacture of irregularly shaped rubber articles by molding may be illustrated by reference to the molding of corrugated rubber gas mask tubes. Not only is it necessary that the mold impression be accurate, but it is also essential to provide a corrugated wall of uniform thickness and free from cells and cavities such as are formed by inclusion of air bubbles between the rubber tube and the mold wall. If the wall is not uniform in thickness the tube is subject to kinking and pinching with the movements of the wearer, and the air supply may be shut off as a consequence. Moreover, cells and cavities tend to weaken the wall of the tube, and to make it porous, are dangerous, and cannot be tolerated. Accordingly it is an object of this invention to provide an improved method by which articles of irregular shape may be molded with a high degree of accuracy, and by which articles may be made having uniform walls free from air bubbles. More specifically, it is an object of this invention to provide a method by which articles such as corrugated gas mask tubes may be produced, which are free from air bubbles and other weakening defects of the tube wall; which are characterized by great uniformity of wall thickness; and which possess the necessary flexibility and extensibility. Heretofore, the manufacturing cost has been greatly increased because of the high percentage of defective tubes. It is another object of this invention to provide an exact dependable, method for producing gas mask tubes, and in which the manufacturing cost will be reduced to a minimum.

These and other objects will become clear from the specification and the drawing in which:

Fig. 1 is a sectional elevational view of a tubular mold for use in forming a tube of gel in accordance with the invention;

Fig. 2 is a sectional elevational view of a tank used in carrying out one step of the method;

Fig. 3 is a sectional longitudinal view of a tube of latex gel;

Fig. 4 is a similar view of the tube shown in Fig. 3 having its ends closed in preparation for further treatment;

Fig. 5 is a longitudinal sectional view of a mold used for carrying out another step of the method;

Fig. 6 is an enlarged fragmentary sectional view taken upon the line 6—6 of Fig. 5; and Fig. 7 is a sectional view of another apparatus used in carrying out another step of the method.

In accordance with the invention a hollow article is formed by subjecting an aqueous dispersion of rubber to proper conditions for an appropriate time to produce a gel which is capable of plastic flow in the wet gel state. The article is then given the desired final shape by applying pressure to the gel to force it against the inner wall of a hollow mold, thereby bringing about plastic flow of the gel and causing the article to assume the shape of the mold. Pressure may be applied to the gel mechanically, or by filling the gel with a liquid such as water, or in any desired way, but in practice we prefer to carry out the pressure-molding step by inflating the gel with air under pressure. In order to avoid air bubbles collecting between the tube and the mold, it is necessary to provide a means for the entrapped air to escape from the mold. This may be done by forming suitable air vents in the mold.

A definition of the term "plastic flow" as applied to rubber gels and a description of the methods by which plastic gels may be produced will be found in copending application S. N. 243,586 filed December 2, 1938, by William C. Ross and Arnolf P. Rehbock.

Briefly, a plastic gel is one which is so soft that it may be permanently deformed in response to an extraneous force. It may therefore be distinguished from the tough, elastic gels of the prior art, which set up opposing forces within the gel tending to return the article to its original shape immediately the deforming force is removed. The inflation of hollow articles made from such plastic gels is characterized by the fact that the gel can be inflated to a considerable extent without any rise in internal pressure, i. e. without the development of elastic forces tending to return the article to its original size. This phenomenon is designated by the name "plastic flow."

In the above mentioned copending application, a soft or plastic gel is produced by controlling the conditions under which gelation of the aqueous dispersion of rubber takes place. For example, the shorter the gelation time, the softer and more extensible the gel will be. Other variables may likewise be controlled to produce the desired gel properties, for example, temperature of gelation, and mass concentration of coagulant in the mix.

We have discovered that such a gel, because it is inelastic and capable of plastic flow, can be forced into exact conformity with the shape of the mold against which it is inflated, without any tendency to retract or draw away from the mold. Furthermore, since the rubber particles in an expanding soft gel envelope tend to distribute themselves evenly, an accurately formed article of uniform wall thickness is produced. Finally, as has been disclosed in the above-mentioned application, the property of plasticity in the gel state inevitably results in high extensibility and flexibility of the finished article.

It is possible, therefore, to produce corrugated tubes by this method which fulfill all the requirements for gas mask tubes as stated above. The invention is not necessarily limited to the production of corrugated tubes, but may be applied to the manufacture of other irregularly shaped molded articles, if suitable molds and molding techniques are used.

In the manufacture of gas mask tubes in accordance with the invention a preform is first formed in a suitable manner, for example by casting. A suitable compounded latex dispersion containing a dormant coagulant is poured into a tubular mold M (Fig. 1) comprising a tubular wall 10 of aluminum which is closed at its ends by detachable caps 11 and 12 which also serve to position a core 13 accurately within the mold. The mold is then placed in a tank 15 (Fig. 2) containing water W at a temperature of about 71° C., and allowed to remain in the hot water for about five minutes to cause the dispersion to form a gel preform G (Fig. 3) which is capable of plastic flow in the wet gel state. The mold is then removed from the tank and chilled in water at 11° C.

The preform G is removed from the mold and plugs 16 and 17 are inserted in its ends (Fig. 4). The plug 16 is solid and bears an annular flange 18. The plug 17 also bears an annular flange 19 and is provided with a passage 20 communicating with the interior of the tube G. The wall of the passage 20 is provided with a threaded portion 21 to receive a compressed air conduit.

The preform G having the plugs 16 and 17 inserted in its ends is now positioned in a split hollow mold S (Fig. 5) provided with annular grooves for receiving and retaining the flanges 18 and 19. The inner surface of the mold S is provided with corrugations 25, the ribs of which are positioned adjacent the wall of the tube G. The adjacent engaging surfaces of the halves of the mold S are roughened as indicated at 27 (Fig. 6) to provide leakage paths for air which otherwise would be trapped between the outer surface of the gel G and the inner wall of the mold S. After the halves of the mold S are suitably clamped together a compressed air conduit 26 is connected to the passage 20 and air under a pressure of about 30 pounds per square inch is supplied to the interior of the preform G to cause the latter to be expanded into the recesses of the corrugations 25. As air under pressure is supplied to the interior of the preform G it causes the latter to expand, and air trapped between the preform G and the inner wall of the mold S is forced through the paths 27. The air pressure is maintained for about 15 minutes. In the course of this time plastic flow of the gel takes place, and the wall of gel is forced into intimate contact with the mold S, forming a corrugated tube T of gel, the wall of which is of great uniformity in thickness.

The removal of water from the gel is usually brought about by synaeresis, which may be accomplished by immersing the gel in water. In practice, the tube of gel T is mounted upon a shaft 30 (Fig. 7), which is mounted for rotation in bearing 31 in the wall of a tank 32 and positioned to permit the tube T to be partly immersed in water 33 in the tank. The tube T is rotated slowly by a driving mechanism 35 so that its surface is alternately immersed in water and exposed to the air. The gel is then dried and vulcanized in an air chamber at 70° C. for three hours. The degree of cure may be varied to obtain the properties desired in the final product.

We claim:

1. The process of forming a rubber article which includes making a suitable mixture of an aqueous dispersion of rubber and a gelling agent, converting the mixture into an inelastic gel capable of plastic flow under stress, molding the gel to final shape by applying pressure to the gel to bring about plastic flow, and drying and vulcanizing the formed gel.

2. The process of forming a corrugated rubber gas mask tube of uniform wall thickness which includes casting a hollow tube of rubber gel of smaller size than the finished tube by filling a mold with a liquid mixture of an aqueous dispersion of rubber and gelling and vulcanizing agents and heating the mold sufficiently to convert the mixture to an inelastic gel capable of plastic flow under stress, molding the tube of rubber gel by applying pressure to its inside surface to cause plastic flow of the gel material into intimate contact with the inside surface of a hollow corrugated mold and drying and vulcanizing the gel.

3. The process of forming an irregularly shaped hollow article which includes inserting in a mold a hollow preform of smaller size than the article and consisting of an inelastic gel of rubber material capable of plastic flow under stress and molding the preform to final shape by flowing the gel material under pressure into intimate contact with the mold surface.

4. The process of forming a hollow rubber article from a liquid latex composition containing a gelling agent including casting an undersize preform by running the composition into a mold and heating the mold until the composition is converted into an inelastic gel capable of plastic flow under stress, removing the preform from the mold, and forming it into final shape by expanding it into a second mold.

5. The process of forming a hollow rubber article from a liquid latex composition containing a gelling agent, including casting an undersize preform by running the composition into a mold and heating the mold until the composition is converted into an inelastic gel capable of plastic flow under stress, removing the preform from the mold, forming it into final shape by flowing the gel material under pressure into intimate contact with a second mold, and drying and vulcanizing the gel.

6. The process of forming a hollow irregularly shaped rubber article from a liquid latex composition containing a gelling agent which includes forming a hollow preform of smaller size than the finished article by heating the liquid in a preform mold sufficiently to convert it into an inelastic gel capable of plastic flow under stress, removing the preform from the preform mold and molding the preform to final shape by applying pressure to its interior to cause plastic flow of the gel material.

WILLIAM C. ROSS.
EARLE E. ANDERSON.